United States Patent
Goldman-Shenhar et al.

(10) Patent No.: US 10,053,112 B2
(45) Date of Patent: Aug. 21, 2018

(54) SYSTEMS AND METHODS FOR SUGGESTING AND AUTOMATING ACTIONS WITHIN A VEHICLE

(71) Applicants: Claudia V. Goldman-Shenhar, Mevasseret Zion (IL); Amir Konigsberg, Herzliya Pituach (IL); Omer Tsimhoni, Ramat Hasharon (IL)

(72) Inventors: Claudia V. Goldman-Shenhar, Mevasseret Zion (IL); Amir Konigsberg, Herzliya Pituach (IL); Omer Tsimhoni, Ramat Hasharon (IL)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 72 days.

(21) Appl. No.: 14/477,408

(22) Filed: Sep. 4, 2014

(65) Prior Publication Data
US 2016/0068169 A1    Mar. 10, 2016

(51) Int. Cl.
*B60W 50/14* (2012.01)
*G06F 9/451* (2018.01)
(Continued)

(52) U.S. Cl.
CPC .......... *B60W 50/14* (2013.01); *G06F 9/4446* (2013.01); *G06F 9/453* (2018.02); *G06N 5/02* (2013.01);
(Continued)

(58) Field of Classification Search
CPC .......... B60W 50/14; B60W 2050/146; B60W 2540/04; G06F 9/4446; G06N 5/02
See application file for complete search history.

(56) References Cited

U.S. PATENT DOCUMENTS

| 7,526,722 B2* | 4/2009 | Wadhwa | G06F 9/4446 715/705 |
| 2005/0114775 A1* | 5/2005 | Inui | G06F 9/4446 715/707 |

(Continued)

OTHER PUBLICATIONS

Horvitz, Eric, et al. "The Lumiere project: Bayesian user modeling for inferring the goals and needs of software users." Proceedings of the Fourteenth conference on Uncertainty in artificial intelligence. Morgan Kaufmann Publishers Inc., 1998.*

(Continued)

*Primary Examiner* — Alan D Hutchinson
(74) *Attorney, Agent, or Firm* — Cynthia R. Parks; Parks IP Law LLC (57) ABSTRACT

The present disclosure relates to systems for implementing a computer-readable storage device comprising instructions, including a behavior recognizer, that, when executed by a system having a processor, cause the processor to perform operations, for providing personalized proactive assistance to a vehicle user. The operations comprise receiving a behavior input data package comprising a sequence of user events using the behavior recognizer, and determining the behavior input data package indicates proactive assistance to be presented to the vehicle user by the system, using a user behavior model and a machine state model of the behavior recognizer. The disclosure also relates to methods for providing personalized proactive assistance to a vehicle user.

20 Claims, 4 Drawing Sheets

(51) Int. Cl.
 *G06F 9/44* (2018.01)
 *G06N 5/02* (2006.01)
(52) U.S. Cl.
 CPC ... *B60W 2050/146* (2013.01); *B60W 2540/04* (2013.01)

(56) References Cited

U.S. PATENT DOCUMENTS

2006/0218506 A1\* 9/2006 Srenger ................ G06F 9/4446
 715/810
2015/0162000 A1\* 6/2015 Di Censo ................ G10L 15/22
 704/270.1

OTHER PUBLICATIONS

Wikipedia article, Office Assistant, printed Jan. 8, 2016.\*

\* cited by examiner

Fig-3

SYSTEMS AND METHODS FOR SUGGESTING AND AUTOMATING ACTIONS WITHIN A VEHICLE

TECHNICAL FIELD

The present technology relates to a computing structure including a software architecture that facilitates implementation of instructions that provide personalized proactive assistance to a vehicle user. More specifically, the technology relates to computing structure including software that identifies vehicle user behavior that deviates from an optimal standard of use and provides user assistance.

BACKGROUND

Vehicle automation to perform specific tasks, such as autonomous or adaptive cruise control, automatic parking, blind spot monitoring, and the like, has become commonplace in many vehicles. For example, a vehicle can park itself based on environmental inputs received from vehicle sensors and transferred to a control system within the vehicle, such as steering functions.

In addition to vehicle automation, personalization of information-based media content and programming, collectively known as infotainment, has been integrated into vehicles in order to enhance a driver and/or passenger experience while inside of the vehicle. Personalized infotainment systems generate customized suggestions which are presented to the user to personalize the experience of the user within the vehicle based previous user interaction (e.g., downloading applications of interest) with the infotainment system.

However, infotainment systems, do not have access to all operational systems within the vehicle. Suggestions presented to the user are based on data which is derived from only particular systems within the car (e.g., user inputs to a control stack), not data from all vehicle systems. For example, a vehicle system may recommend a radio station to a user based on previous radio station selections, but the same system cannot assist the user with other functions within the vehicle, such as controlling air conditioning settings.

SUMMARY

The need exists for a system and method to recognize help-sensitive patterns of user behavior and deliver effective and relevant proactive responses. The proposed systems and methods identify vehicle user behaviors that deviate from one or more optimal standards of use for the system, and provide user assistance at an optimal time through a modality determined most suitable according to the nature of the problem.

The present disclosure relates to systems for implementing a computer-readable storage device comprising instructions, including a behavior recognizer, that, when executed by a system having a processor, cause the processor to perform operations, for providing personalized proactive assistance to a vehicle user. The operations comprise (i) receiving a behavior input data package comprising a sequence of user events using the behavior recognizer, and (ii) determining the behavior input data package indicates proactive assistance to be presented to the vehicle user by the system, using a user behavior model and a machine state model of the behavior recognizer.

In some embodiments, the operations further comprise the system (i) determining the sequence of user events includes a first user event that is substantially the same as a subsequent user event within a predetermined period of time, and (ii) generating a query search data set comprising the first user event the subsequent user event.

In some embodiments, the operations further comprise the system (i) checking at least one database within the system for a result data set comprising the query search data set, and (ii) presenting the result data set to the vehicle user.

In some embodiments, the operations further comprise the system (i) determining the sequence of user events does not include one user event that is substantially the same as a subsequent user event, and (ii) determining at least one of the sequence of user events within the behavior input data package can be eliminated. In further embodiments, the system executes operations that determining the sequence of user events can be executed automatically by the system.

In some embodiments, the operations further comprise the system (i) generating a recommendation comprising an improvement sequence to eliminate at least one of the sequence of user events, and (ii) presenting the recommendation to the vehicle user.

The disclosure also relates to methods for providing personalized proactive assistance to a vehicle user. The methods executed by a system having a processor comprise (i) receiving a behavior input data package comprising a sequence of user events using a behavior recognizer, and (ii) determining the behavior input data package requires proactive assistance be presented to the vehicle user, using a user behavior model and machine state model of the behavior recognizer.

In some embodiments, the operations further comprise the system (i) determining the sequence of user events includes a first user event that is substantially the same as a subsequent user event within a predetermined period of time, and (ii) generating a query search data set comprising the first user event the subsequent user event.

In some embodiments, the methods further comprise the system (i) checking at least one database within the system for a result data set comprising the query search data set, and (ii) presenting the result data set to the vehicle user.

In some embodiments, the methods further comprise the system determining the sequence of user events does not include one user event that is substantially the same as a subsequent user event.

In some embodiments, the methods further comprise the system determining at least one of the sequence of user events within the behavior input data package can be eliminated.

In some embodiments, the methods further comprise the system determining the sequence of user events can be executed automatically by the system.

In some embodiments, the methods further comprise the system (i) generating a recommendation comprising an improvement sequence to eliminate at least one of the sequence of user events, and (ii) presenting the recommendation to the vehicle user.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, illustrative, and similar terms, refer expansively to embodiments that serve as an illustration, specimen, model or pattern.

Descriptions are to be considered broadly, within the spirit of the description. For example, references to connections between any two parts herein are intended to encompass the two parts being connected directly or indirectly to each other. As another example, a single component described herein, such as in connection with one or more functions, is to be interpreted to cover embodiments in which more than one component is used instead to perform the function(s). And vice versa—i.e., descriptions of multiple components herein in connection with one or more functions is to be interpreted to cover embodiments in which a single component performs the function(s).

In some instances, well-known components, systems, materials or methods have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

While the present technology is described primarily in connection with a vehicle in the form of an automobile, it is contemplated that the technology can be implemented in connection with other vehicles, such as marine craft and air craft.

I. Overview of the Disclosure—FIG. 1

Figure 1:
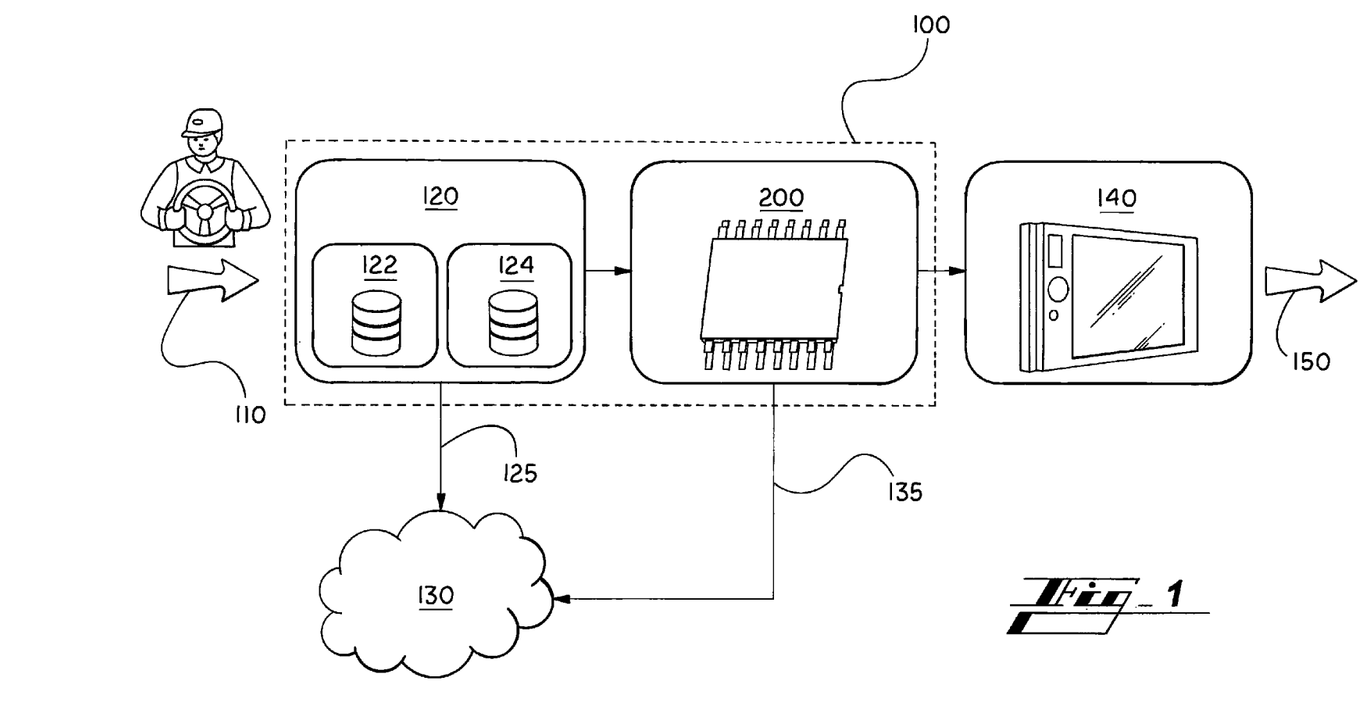
FIG. 1 illustrates a behavior monitoring system in accordance with an exemplary embodiment.

Now turning to the figures, and more particularly the first figure, FIG. 1 shows a behavior monitoring system 100 including a recognizer 120 and a controller 200. The monitoring system 100 is configured to receive, from a user, behavior inputs 110 that affect the operations of the vehicle system being monitored.

The recognizer 120 is configured to, when executed by a processor, perform safety functions associated with automated and semi-automated driving. The recognizer 120 receives the behavior inputs 110 from the user, or from appropriate machine-user-interface components, and either a user behavior model 122 and/or a machine state model 124 recognizes the inputs 110.

The model 122 may recognize user input such as specific inputs and menu choices made by the user, the number of times the user executes a specific task, how often the user fails to execute a specific task, or any other sequence of actions captured by the system in relation to the user interaction with an in-vehicle system. For example, the model 122 can recognize that the user has requested instructions on how to operate the stereo functions and provide instructions on stereo operations.

The machine state model 124 recognizes which vehicle programs are associated with the behavior input 110 received by the user. Data received by the recognizer 120 and deciphered by the model 124 can include data, vehicle system and subsystem data (e.g., cruise control function). As an example, the model 124 can recognize if the user unsuccessfully attempts to turn off cruise control and correlate to the unsuccessful attempts vehicle instructions on how to operate cruise control.

Each behavioral sequence of events can be recognized by the system 100 and an associated query corresponding to the sequence of events can be constructed by the system 100 and optionally stored to a repository 130. The data generated from the recognizer 120, including the data from the user behavior model 122 and the data from machine state model 124 may optionally be stored to a repository 130 by transmitting a signal 125. The repository 130 can be internal or external to the monitoring system 100.

The data stored to the repository 130 can be used to provide personalized services and recommendations based on the specific behavior of the user (e.g., inform the user about repetitive problems through mobile services). Stored data can include actual behavior of a specific user, sequences of behavior of the specific user, and the meaning of the sequences for the specific user, among others.

The data stored within the repository 130 may be transmitted as a computer readable code disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium).

The repository 130 may also transmit the stored data to and from the controller 200. Additionally, the repository 130 may receive information transmitted by the recognizer 120. Finally, the repository 130 may be used to facilitate reuse of certified code fragments that might be applicable to a range of applications internal and external to the monitoring 100.

In some embodiments, the repository 130 extracts behavior data across multiple users. Aggregated data can be derived from a community of drivers whose behaviors are being monitored by the system 100 and may be stored within the repository 130. Having a community of drivers allows the repository 130 to be constantly updated with the aggregated queries, which can be communicated to the controller 200 via the signal 135. The queries stored to the repository 130 can be used to provide personalized services and recommendations based on large data logged from multiple users.

Figure 2:
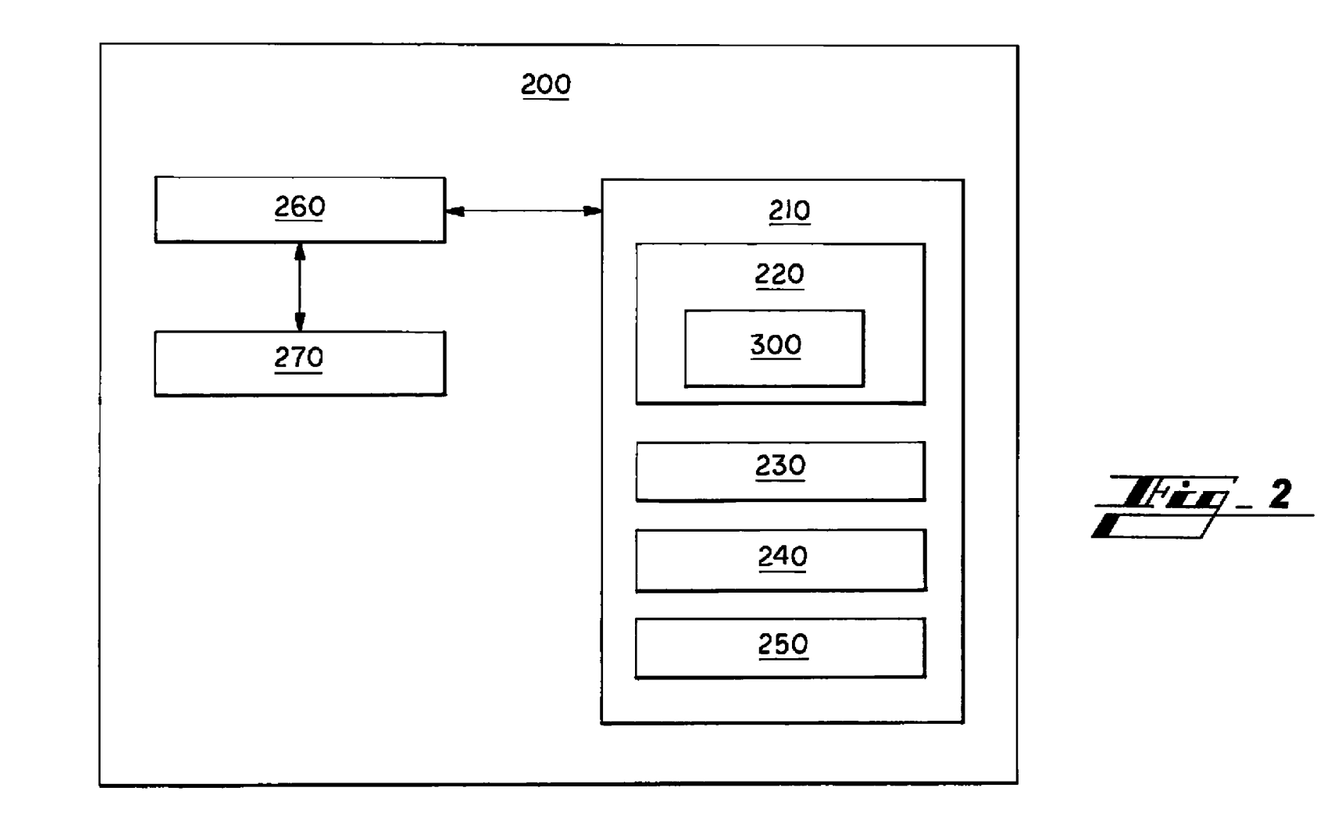
FIG. 2 is a block diagram of a controller of the behavior monitoring system in FIG. 1.

The monitoring system also includes FIG. 2 illustrates the controller 200 may be a microcontroller, microprocessor, programmable logic controller (PLC), complex programmable logic device (CPLD), field-programmable gate array (FPGA), or the like. The controller may be developed through the use of code libraries, static analysis tools, software, hardware, firmware, or the like. Any use of hardware or firmware includes a degree of flexibility and high-performance available from an FPGA, combining the benefits of single-purpose and general-purpose systems. After reading this description, it will become apparent to a person skilled in the relevant art how to implement the technology using other computer systems and/or computer architectures.

The controller 200 includes a memory 210. The memory 210 may include several categories of software and data used in the monitoring system 100, including, applications 220, a database 230, an operating system (OS) 240, and I/O device drivers 250.

As will be appreciated by those skilled in the art, the OS 240 may be any operating system for use with a data processing system. The I/O device drivers 250 may include various routines accessed through the OS 240 by the applications 220 to communicate with devices and certain memory components.

The applications 220 can be stored in the memory 210 and/or in a firmware (not shown) as executable instructions and can be executed by a processor 260.

The applications 220 include various programs, such as a proactive help sequence 300 described below that, when executed by the processor 260, process data received into the integration device 220.

The applications 220 may be applied to data stored in the database 230, such as the specified parameters, along with data, e.g., received via the I/O data ports 270. The database 230 represents the static and dynamic data used by the applications 220, the OS 240, the I/O device drivers 250 and other software programs that may reside in the memory 210.

While the memory 210 is illustrated as residing proximate the processor 260, it should be understood that at least a portion of the memory 210 can be a remotely accessed storage system, for example, a server on a communication network, a remote hard disk drive, a removable storage medium, combinations thereof, and the like. Thus, any of the data, applications, and/or software described above can be stored within the memory 210 and/or accessed via network connections to other data processing systems (not shown) that may include a local area network (LAN), a metropolitan area network (MAN), or a wide area network (WAN), for example.

It should be understood that FIG. 2 and the description above are intended to provide a brief, general description of a suitable environment in which the various aspects of some embodiments of the present disclosure can be implemented. While the description refers to computer-readable instructions, embodiments of the present disclosure can also be implemented in combination with other program modules and/or as a combination of hardware and software in addition to, or instead of, computer readable instructions.

The term "application," or variants thereof, is used expansively herein to include routines, program modules, programs, components, data structures, algorithms, and the like. Applications can be implemented on various system configurations including single-processor or multiprocessor systems, minicomputers, mainframe computers, personal computers, hand-held computing devices, microprocessor-based, programmable consumer electronics, combinations thereof, and the like.

The applications 220 includes, among others, a proactive help sequence 300 (seen in FIG. 3), described in further detail below.

One or more output devices 140 are used to communicate personalized help output 150 to the user to aid the user in recent tasks executed or failed. The output devices 140, may provide information by visual, auditory, or tactile interfaces to a vehicle occupant about changing vehicle conditions (e.g., changing position of objects detected in a surrounding environment). For example, the output device 140 may display text or video to a monitor within the vehicle or text instructions to a mobile device when the vehicle is no longer moving. As another example, the output component may provide audio speaking instructions from components within the vehicle (e.g., speakers).

As understood by one in the art, the monitoring system 100 can include one or more other devices and components within the monitoring system 100 or in support of the monitoring system 100. For example, multiple controllers may be used to recognize behavior and produce adaptive sequences. Additionally, multiple interfaces may be required for executing distinct vehicle functions such as acceleration and deceleration.

II. Methods of Operation—FIGS. 3-5

Figure 3:
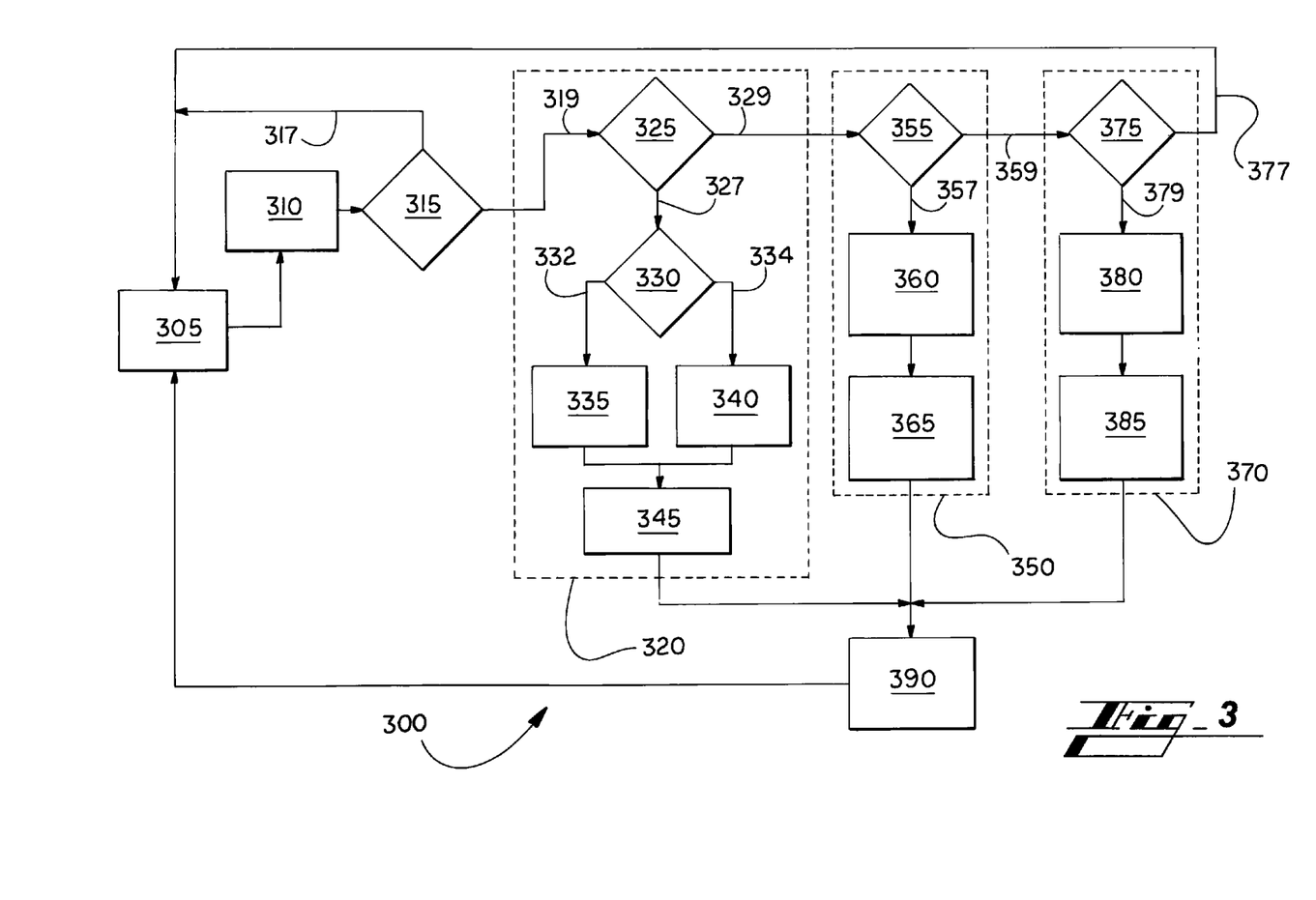
FIG. 3 is a flow chart illustrating methods for performing a proactive help sequence in accordance with an exemplary embodiment.

FIG. 3 is a flow chart illustrating methods for performing a proactive help sequence 300.

It should be understood that the steps of the methods are not necessarily presented in any particular order and that performance of some or all the steps in an alternative order, including across these figures, is possible and is contemplated.

The steps have been presented in the demonstrated order for ease of description and illustration. Steps can be added, omitted and/or performed simultaneously without departing from the scope of the appended claims. It should also be understood that the illustrated method or sub-methods can be ended at any time.

In certain embodiments, some or all steps of this process, and/or substantially equivalent steps are performed by a processor, e.g., computer processor, executing computer-executable instructions, corresponding to one or more corresponding algorithms, and associated supporting data stored or included on a computer-readable medium, such as any of the computer-readable memories described above, including the remote server and vehicles.

The method 300, among other methods, (i) determines if proactive help is necessary, (ii) checks, using a failure sequence 320, for a user's failure to accomplish a desired task, (ii) checks, using an improvement sequence 350, for user behavior which can be improved, or (iv) checks, using an automation sequence 370, for user behavior which can be automated.

The method 300 begins by monitoring the system 100 at step 305. The software may be engaged through the controller 200. The monitoring may occur at specific time intervals (e.g., every ten seconds). The monitoring may alternately occur based on a predetermined number of user interactions with the vehicle (e.g., every three user tasks within the vehicle).

Next, at step 310, the system 100 receives the behavior input 110. Each user interaction may be logged by the system 100 as part of a behavior sequence. If too much time has elapsed between a first user interaction and a subsequent user interaction, then the system 100 may start a new behavior sequence using the second subsequent reaction as the first interaction of the new behavior sequence.

The help sequence 300 can apply to any length of interactive events (e.g., sequence) between the user and the vehicle sequence and variables. As an example, a user sequence consisting of events a, b, and c through which the user can activate some function within the vehicle, e.g., pressing a button or touching a screen. When the interactive event by the user does not translate into another machine state, the event is deemed a failed event (failure event).

As an example, the system 100 may determine if the user has entered the same request multiple times during the specific time interval and deduct that the proactive help sequence 300 is required.

Next, the sequence 300 determines if proactive help is necessary at step 315. Help is warranted if the system 100 detects improper requests by the user to conduct a sequence, the user specifically requests help, or the user successfully accomplishes a desired task, but not in the most efficient manner.

If proactive help is not necessary (e.g., path 317), the assistance of the system 100 not required. For example, if assistance with a particular task has been previously presented to the user multiple times and the user never used the assistance, then proactive help is not necessary for the task. As another example, if the user has stated with explicit feedback that he/she is not interested in proactive-help with respect to the particular task, then proactive help is not necessary for the task.

If proactive help is necessary (e.g., path 319), the help sequence 300 checks for a user's failure to accomplish a desired task using a failure sequence 320. The failure sequence 320 first determines if a failure mode exists at step 325. The sequence 320 check determines whether a failure mode definition exists on a given user input into the system 100.

If a failure mode exists (e.g., path 327), the failure sequence 320 determines if the interactive events by the user are the same at step 330. More specifically, the failure sequence 320 determines if the user entered the same request multiple times in an attempt to transition from one state to another state. The same request may be deemed as a failure mode if a first user request is not within a certain timing (e.g., two seconds) of a succeeding user request.

If the interactive events do not include the same request (e.g., path 332), the failure sequence 320 will generate an activate query at step 335 designed to provide help to execute an interactive event 'a' that will allow the user to transition from one state to another. Specifically, the sequence 320 defines the query that is eventually sent to an application 220 (e.g., search engine) within the controller 200. For example, the sequence can define within the application 220 the interactive event 'a' (e.g., "how does the user activate 'a'?"). The query may search databases 230 for information associated with how to activate 'a' as requested by the user.

If the interactive events each include the same request (e.g., path 334), the failure sequence 320 will generate a define query at step 340 designed to provide help to execute an interactive event 'a' that will allow the user to transition from one state to another. For example, the sequence 320 requests instructions at step 340 within the application 220 to define the interactive event (e.g., "what is 'a'?"). The query may search databases 230 for information associated with 'a' as requested by the user.

Once the query has been activated or defined, the query is submitted to the search functions within the vehicle at step 345. The query produces results for the user on how to transition from one state to another (i.e., how to successfully accomplish the interactive event). Any results generated by the failure sequence 320 is presented to the user at step 390. The presentation of the results can occur on one or more output devices 140 for the user to view.

Figure 4:
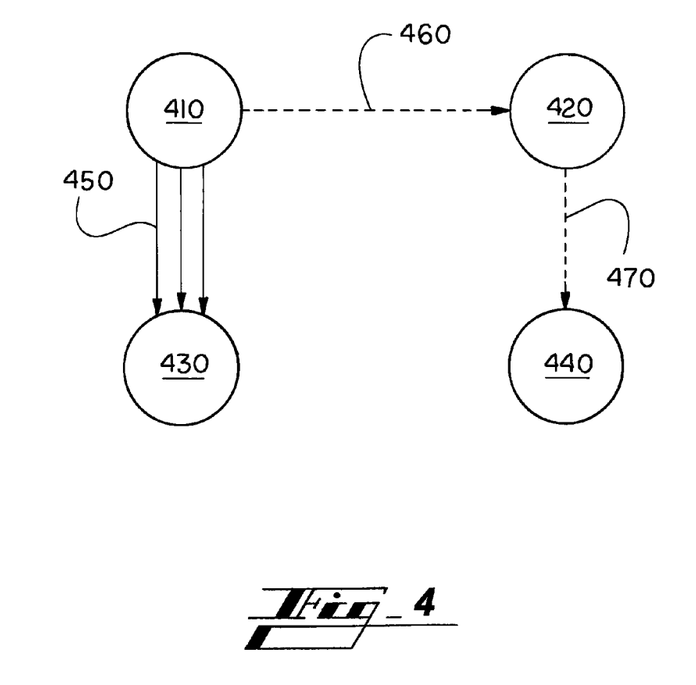
FIG. 4 illustrates an exemplary failure sequence and recommended sequence from FIG. 3.

FIG. 4 illustrates an exemplary failure sequence 320 and recommendation. In FIG. 4, the user attempts to transition from State I at 410 to State IV at 440, however, the system recognizes the user's failed inputs (depicted as solid arrows 450) from State I at 410 to State III at 430. The system 100 then recommends a series of steps (depicted as dashed arrows 460 and 470) to assist the arrival of the user at the desired State IV at 440 by way of State II at 420.

As an example, the system 100 would recommend a corrective course of action to assist the user if cruise control is activated and disengaged, but the user presses a "cancel" command. The system recognizes the invalid sequence of events, translates the invalid sequence into a query, sends the query to a database and provides a response to the driver—e.g., instruction to turn off the cruise control.

As another example, if the user continues to activate/de-active a button repeatedly once a circulating fan has been set to the "off" position. The system 100 recognizes the invalid sequence of events of repeatedly pushing buttons, translates it into a query, sends the query to a database and provides a response to the driver—e.g., instructions to change the air conditioning settings.

If no failure mode exists (e.g., path 329), the sequence 300 checks whether the user input matches the improvement sequence 350. The improvement sequence 350 checks for user behavior which can be improved by the system 100. The sequence 350 check determines whether an improvement definition exists on a given user input into the system 100.

At step 355, the improvement sequence 350 determines if a desired task executed by the user is improvable. The desired task can be improved if the number of steps it takes the user to go from one task to another task can be accomplished in less steps than executed by the user.

An improvable behavior is a sequence of interactive events for which there exists an alternate sequence that achieves the same purpose as the user sequence. The improvable behavior is better than the user sequence and also reaches the same target state in the machine model. The alternate sequence can be shorter (i.e., requires less interactive events) or improved in regards to other characteristics (e.g., executing the sequence with speech instead of pushing buttons).

If the user task is improvable (e.g., path 357), an improvement sequence is created at step 360. The improvement sequence can be created and/or assigned to as a recommendation to the user.

Figure 5:
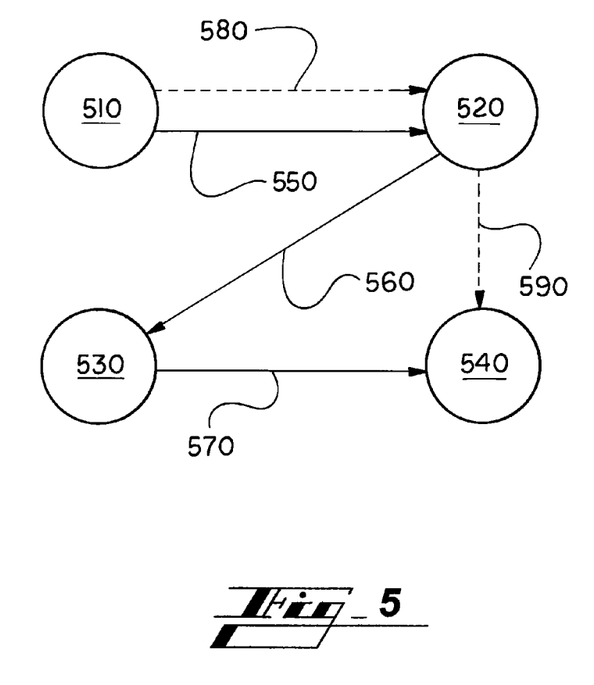
FIG. 5 illustrates an exemplary improvement sequence from FIG. 3.

FIG. 5 illustrates an exemplary improvement sequence 350. In FIG. 5, the user transitions from State I at 510 to State IV at 540 by executing three steps. Specifically the user executes step 1 from State I at 510 to State II at 520 (depicted as solid arrow 550), step 2 from State II at 520 to State III at 530 (depicted as solid arrow 560), and step 3 from State III at 530 to State IV at 540 (depicted as solid arrow 570). However, the system 100 recognizes the user has executed three steps, when the same result can be reached an alternate sequence of two steps (depicted as dashed arrows 580, 590) to arrive at State IV at 540 by way of State II at 520.

As an example, the system 100 would recommend an improved course of action to assist the user, if the system 100 recognizes that the user only interacts with lower buttons on central stack, but does not use a touchscreen also on the center stack. In such a situation, the system 100 may provide the user information on how to operate the touchscreen, for example, by displaying instructions on the touchscreen or sending an email or text message to the user for future reference.

At step 365, the sequence 300 computes an improvement recommendation for the user on how to transition from one state to another (i.e., how to successfully accomplish the interactive event). Any results generated by the improvement sequence 350 is presented to the user at step 390.

If the task is not improvable (e.g., path 359), the sequence 300 runs the automation sequence 370. The automation sequence 370 checks for user behavior which can be automated by the system 100. The sequence 370 check determines whether an automation definition exists on a given user input into the system 100.

At step 375, the automation sequence 370 determines if an automation structure and instruction exists for the desired task requested by the user. The desired task can be automated if a predetermined automated structure is stored within a vehicle system or database (e.g., repository 130), and the controller 200 contains executable medium, which can execute the automated structure with minimal, or no, interaction from the user.

When the user task cannot be automated (e.g., path 377), the assistance of the system 100 not required. When assistance of the system 100 is not required, the system returns to a state of monitoring at step 305.

When the user task can be automated (e.g., path 379), the automation sequence 370 recalls the automation structure at step 380. The recalled automation structure is then computed as an automation recommendation at step 385.

Any improvement or automation recommendations generated by the improvement sequence 350 or the automation sequence 370, respectively, is presented to the user at step 390. The presentation of the recommendations can occur on one or more output devices 140 for the user to view.

Any results from the failure sequence 320 query, recommendations from the improvement sequence 350, and recommendations from the automation sequence 370 can be presented to the user based on circumstances such as modality (e.g., text when sitting still versus speech when user is driving) and timing (e.g., help provided to the user at a later time after the sequence of events occurred).

The system 100 also takes into account how the user responds to the results and recommendations provided at step 390. If driver disregards a particular result or recommendation a predetermined number of times, then the system 100 may no longer suggest the result or recommendation.

Once any results of the failure sequence 320 query, recommendations from the improvement sequence 350, or recommendations from the automation sequence 370 are presented to the user, the sequence 300 returns to monitoring the system 100 at step 305 for any tasks needing proactive help.

III. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed is:

1. A system, for providing personalized proactive assistance to a vehicle user, comprising:
    a tangible vehicle input device configured to interface with a vehicle user to receive a user input command while the vehicle user is within the vehicle;
    a tangible vehicle output device configured to present information to the vehicle user;
    a hardware-based processor; and
    a non-transitory computer-readable storage device comprising instructions, comprising a user behavior model and a machine state model, that, when executed by the hardware-based processor, cause the processor to:
        receive, from the tangible vehicle input device, a behavior input data package comprising a sequence of user events;
        determine, using the user behavior model and the machine state model, that the sequence of user events indicates a failure mode corresponding to the user failing to accomplish a first intentional user event in the sequence of user events that is the same as a second intentional user event that is immediately subsequent to the first intentional user event in the sequence of user events within a predetermined period of time;
        determine, in response to determining that the sequence of user events indicates the failure mode, to provide a recommendation communication to the vehicle user by way of the tangible vehicle output device, wherein the recommendation communication provides personalized proactive assistance; and
        present, using the tangible vehicle output device, the recommendation communication for receipt by the vehicle user.

2. The system of claim 1, wherein the tangible vehicle output device includes a vehicle tactile component configured to present information to the vehicle user.

3. The system of claim 2, wherein the tangible vehicle output device includes a vehicle audio component configured to present information to the vehicle user.

4. The system of claim 3, wherein the tangible vehicle output device includes a vehicle visual component configured to present information to the vehicle user.

5. The system of claim 4, wherein the vehicle visual component is configured to present textual information to the vehicle user.

6. The system of claim 4, wherein the vehicle visual component is configured to present non-textual visual information to the vehicle user.

7. The system of claim 4, wherein the tangible vehicle input device includes a vehicle touch-sensitive screen component configured to interface with the vehicle user to receive the user input command while the vehicle user is in the vehicle.

8. The system of claim 5, wherein the tangible vehicle input device includes a vehicle button or other physical implement configured to interface with the vehicle user to receive the user input command while the vehicle user is in the vehicle.

9. The system of claim 6, the instructions, when executed by the processor, further cause the processor to generate a query search data set comprising the first intentional user event and the second intentional user event.

10. The system of claim 9, the instructions, when executed by the processor, further cause the processor to:
    query at least one database for a result data set comprising the query search data set; and
    present the result data set to the vehicle user using the tangible vehicle output device.

11. The system of claim 7, the instructions, when executed by the processor, further cause the processor to:
    generate a query search data set comprising the first intentional user event and the second intentional user event.

12. The system of claim 11, the instructions, when executed by the processor, further cause the processor to:

query at least one database for a result data set comprising the query search data set; and present the result data set to the vehicle user using the tangible vehicle output device.

13. The system of claim 8, the instructions, when executed by the processor, further cause the processor to:

determine that the sequence of user events does not include one user event that is the same as a subsequent user event; and determine that the sequence of user events can be executed automatically by the system.

14. The system of claim 13, the instructions, when executed by the processor, further cause the processor to:

generate a recommendation comprising an automation sequence to cause the system to perform at least one of the sequence of user events; and present the recommendation to the vehicle user using the tangible vehicle output device.

15. A method, for providing personalized proactive assistance to a vehicle user by a system having a non-transitory computer-readable storage device and a hardware-based processor executing instructions of the storage device, the instructions comprising a user behavior model and a machine state model, the method comprising:

receiving, from a tangible vehicle input device, by the processor executing the instructions, a behavior input data package comprising a sequence of user events, wherein the tangible vehicle input device is configured to interface with a vehicle user to receive a user input command while the vehicle user is within the vehicle;

determining, by the processor executing the instructions, using the user behavior model and the machine state model, that the sequence of user events indicates a failure mode corresponding to the user failing to accomplish a first intentional user event in the sequence of user events that is the same as a second intentional user event that is immediately subsequent to the first intentional user event in the sequence of user events within a predetermined period of time;

determining, by the processor executing the instructions, in response to determining that the sequence of user events indicates the failure mode, to provide a recommendation communication to the vehicle user by way of a tangible vehicle output device, wherein the recommendation communication provides personalized proactive assistance; and presenting, by the processor executing the instructions, using a tangible vehicle output device configured to present information to the vehicle user, the recommendation communication.

16. The method of claim 15 further comprising querying at least one database within the system for a result data set comprising a query search data set.

17. The method of claim 15 further comprising:

generating, by the processor executing the instructions, a query search data set comprising the first intentional user event the second intentional user event.

18. The method of claim 15 further comprising:

determining, by the processor executing the instructions, that the sequence of user events does not include one user event that is the same as a subsequent user event; and determining, by the processor executing the instructions, that the sequence of user events can be executed automatically a processing system.

19. The method of claim 18 further comprising:

generating, by the processor executing the instructions, a recommendation comprising an automation sequence to cause the system to perform at least one of the sequence of user events; and presenting, by the processor executing the instructions, the recommendation to the vehicle user at the tangible vehicle output device.

20. A method, for providing personalized proactive assistance to a vehicle user by a system having a non-transitory computer-readable storage device and a hardware-based processor executing instructions of the storage device, the instructions comprising a user behavior model and a machine state model, the method comprising:

receiving, from a tangible vehicle input device, by the processor executing the instructions, a behavior input data package comprising a sequence of user events, wherein the tangible vehicle input device is configured to interface with a vehicle user to receive a user input command while the vehicle user is within the vehicle;

determining, by the processor executing the instructions, using the user behavior model and the machine state model, that the sequence of user events includes a failure mode corresponding to the user failing to accomplish a first intentional user event in the sequence of user events;

determining, by the processor executing the instructions, the first intentional user event in the sequence of user events is the same as a second intentional user event that is immediately subsequent to the first intentional user event in the sequence of user events within a predetermined period of time;

generating, by the processor executing the instructions, a recommendation comprising a search query result or sequence by way of a tangible vehicle output device, wherein the recommendation provides personalized proactive assistance; and querying, by the processor executing the instructions, at least one database within the system, for a result data set comprising a query search data.

* * * * *